July 22, 1924.
J. F. DOZIER
APPARATUS FOR TESTING AND REPAIRING RADIATORS
Filed June 8, 1922    2 Sheets-Sheet 1
1,502,553
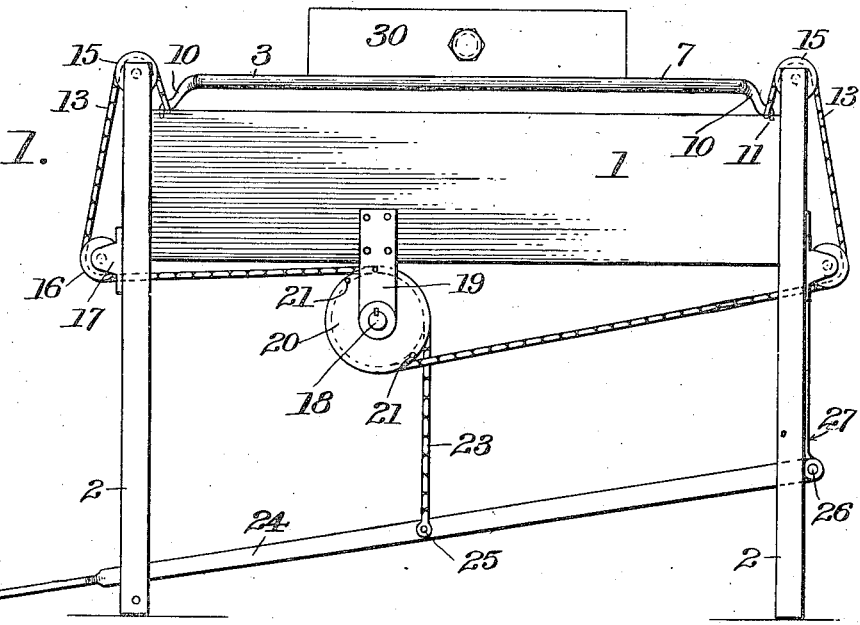
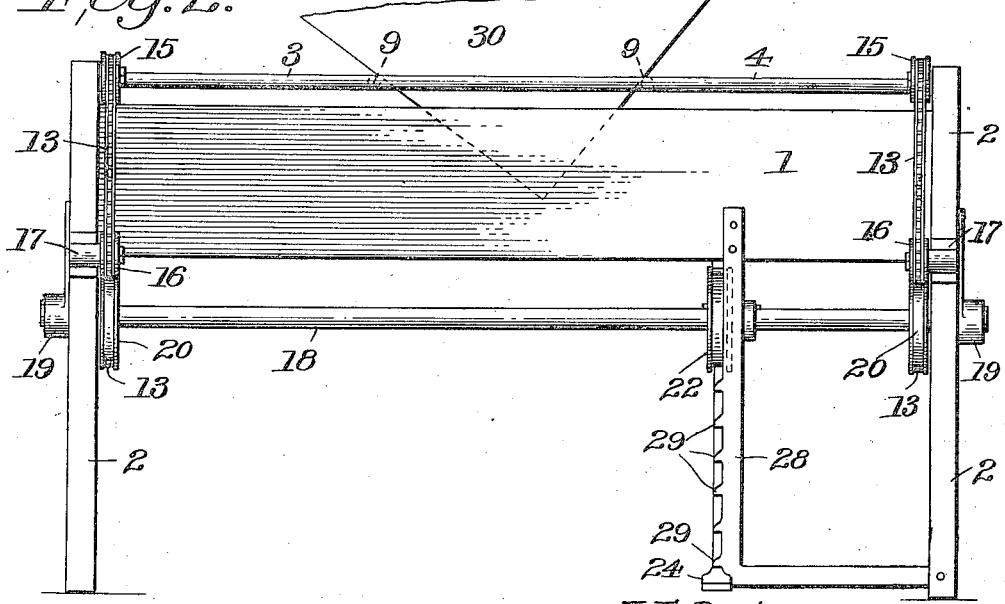
J. F. Dozier
INVENTOR
WITNESSES
BY
ATTORNEY July 22, 1924.
J. F. DOZIER
1,502,553
APPARATUS FOR TESTING AND REPAIRING RADIATORS
Filed June 8, 1922  2 Sheets-Sheet 2
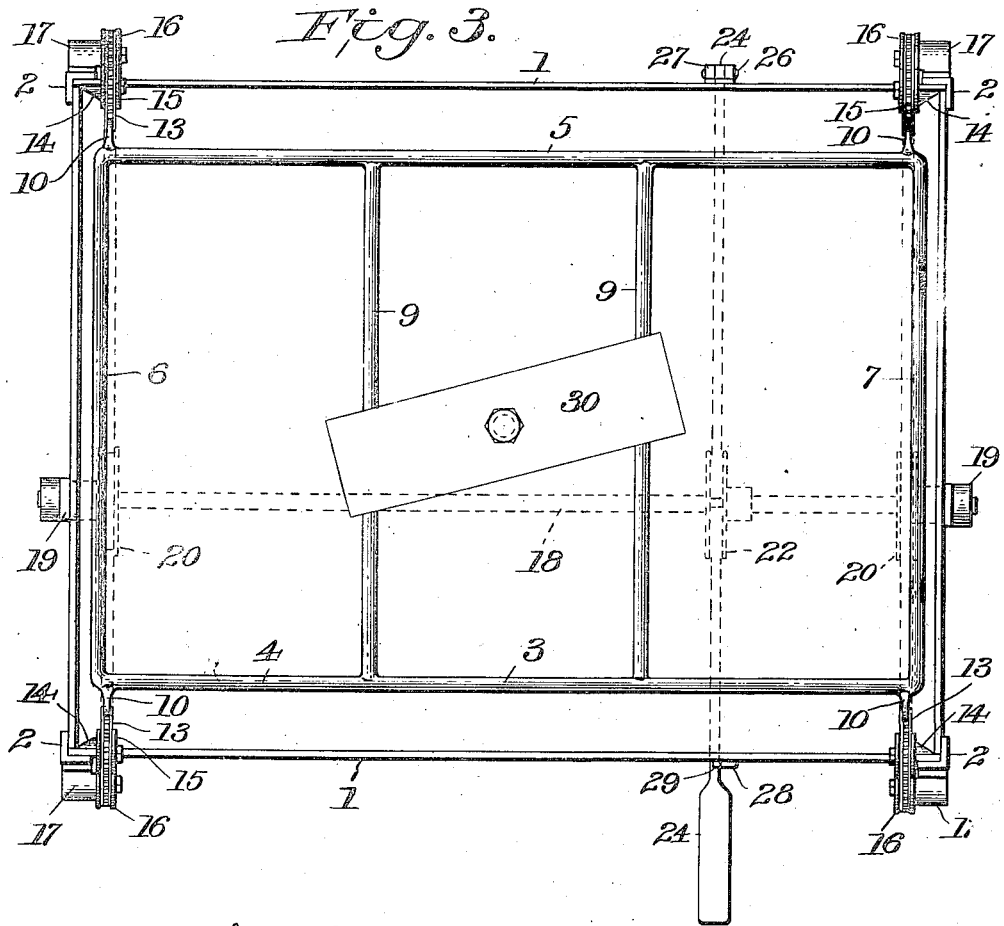
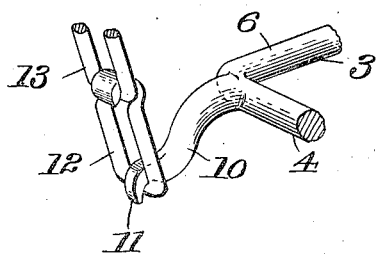
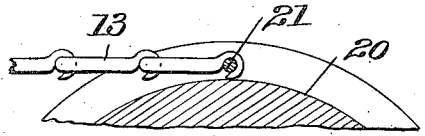
J. F. Dozier
INVENTOR
BY
ATTORNEY
WITNESSES Patented July 22, 1924.

1,502,553

UNITED STATES PATENT OFFICE.

JOE FRANK DOZIER, OF NASHVILLE, TENNESSEE, ASSIGNOR OF ONE-HALF TO J. T. JOLLEY, OF NASHVILLE, TENNESSEE.

APPARATUS FOR TESTING AND REPAIRING RADIATORS.

Application filed June 8, 1922. Serial No. 566,821.

*To all whom it may concern:*

Be it known that I, JOE F. DOZIER, a citizen of the United States, residing at Nashville, in the county of Davidson and State of Tennessee, have invented a new and useful Apparatus for Testing and Repairing Radiators, of which the following is a specification.

My invention relates to improvements in apparatus for testing and repairing automobile radiators, and has for its object the production of an apparatus which is simple in construction, strong and durable, and at the same time inexpensive in initial cost and upkeep.

Another object of my invention is to provide an apparatus which may be easily operated by one person, at the same time leaving the operator's hands free for repairing the radiator.

Another object of my invention is to provide an apparatus for testing radiators, wherein the radiator is immersed in or raised from the tank by means of foot power.

Another object of my invention is to provide an apparatus for testing and repairing radiators which may be attached to most of the tanks and vats now in use in automobile repair shops.

Another object of my invention is to provide an apparatus wherein the leaks in a radiator may be easily and quickly located without the necessity of handling the radiator.

Another object of my invention is to provide an apparatus for testing radiators wherein the supporting frame for the radiator is quickly and easily detached without the use of tools to enable the cleaning of the tank.

The final object of my invention is to provide an apparatus for testing and repairing radiators in which any part or all of a radiator may be immersed in water for testing, after which the same may be raised free of the water to a position to be repaired, without the necessity of the operator using his hands until he is ready to repair any leaks that may have been found.

My invention comprises a tank mounted upon legs, a frame upon which radiators of any shape or size may be placed, and a peculiar arrangement of chains and pulleys for raising or lowering the frame and at the same time maintaining the frame in a horizontal plane. The power is applied through a foot lever for raising or lowering the radiator supporting frame.

My invention will be more fully understood from the following description, reference being had to the accompanying drawings which form a part of this specification, in which—

Fig. 1 is an end elevation of my invention.

Fig. 2 is a front elevation.

Fig. 3 is a plan view.

Fig. 4 is a detail view illustrating the means for supporting the radiator frame.

Fig. 5 is a detail view showing the method of securing the chains to the drums.

Similar characters of reference designate corresponding parts in the several figures of the drawing.

My invention comprises a tank 1 mounted upon legs 2 in the usual manner. The tank may be filled to any desired depth with water or any other liquid that may be used in testing radiators for leaks.

Mounted in such a manner that it may readily be lowered into or raised out of the tank is a rectangular frame 3, comprising front and rear bars 4 and 5, respectively, end bars 6 and 7, and intermediate bars 9, as clearly shown in Fig. 3. All the connections and joints of this frame are welded together and finished smooth on the outside so as not to offer any obstruction to either the radiator or the hands when repairing leaks. Preferably iron pipe is used in the construction of the frame.

At the corners of the frame are downwardly-projecting lugs 10, having hooked ends 11 which engage the end links 12 of chains 13, as clearly shown in Figs. 1 and 4, and it will be readily seen that the chains may be easily disengaged from the hooks 10.

Secured to the legs 2, near the upper ends thereof, are brackets 14, upon which flanged pulleys 15 are mounted to rotate, and similar pulleys 16 have a bearing on brackets 17 secured to the legs 2 near the bottom of the tank 1.

A shaft 18 is hung in brackets 19 attached to the tank 1, and secured to the shafts 18 are flanged drums 20. The chains 13 are arranged in pairs adjacent the ends of the tank, and each chain of a pair are secured to one of the drums 20 on the opposite ends of a diameter taken through the drum. Cotter pins 21 pass through the ends of the chains 13 and the flanges on the drum 20, as clearly shown in Fig. 5.

It will be readily seen by inspection of Fig. 1 of the drawings, that when the drums 20 are rotated by the shaft 18, the chains 13 will all be wound the same amount upon the drums, and as the end of each chain is secured to a corner of the radiator frame, all corners of the frame will be raised to an equal extent, thereby keeping the frame 3 always in a horizontal plane regardless of the height of said frame.

The shaft 18 is rotated by a drum 22 similar to the drums 20, and one end of a chain 23 is secured to the drum by a cotter pin, the connection being the same as that by which the chains 13 are secured to the drums 20. The chain 23 is fastened at its opposite end to a foot lever 24 by a pin 25, as shown in Fig. 1 of the drawing. The lever 24 is pivoted at 26 to a bracket 27 suspended at the back of the tank 1.

Secured to the front of the tank 1, and to one of the legs 2, is a bar 28 having stops 29 to engage the foot lever 24.

By reference to Figs. 1 and 2 of the drawings, it will be seen that the depth of immersion of the radiator and the frame 3, will depend upon which of the stops 29 the lever 24 engages, as it is manipulated by the operator's foot. As shown in the drawings, the lever 24 is engaged by the lowest stop 29 and the frame 3 and radiator resting thereon is above the tank 1 in a position to be repaired.

While I have shown my invention rectangular in shape, as seen in plan view, I do not limit myself to any particular form, as various shapes may suggest themselves to those skilled in the mechanical arts without departing from the spirit of my invention.

The operation of my invention is as follows:—

The frame 3 is raised to the highest position, and the lever 24 held down by the lowest stop 29. The tank 1 is filled to the desired level with water. A radiator 30 is placed on the bars 9 of the frame 3, and air tubes, not shown, are connected to said radiator. The operator disengages the foot lever and lowers the radiator into the water the desired distance, turns on the air and locates any leaks by bubbles arising therefrom. Having located a leak or leaks, he raises the radiator by pressing down on the foot lever and engaging the lowest stop 29 with the lever 24.

The operator can now repair the radiator without removing the same from the frame. After soldering such leaks, the operator can change the position of the radiator on the frame 3 and repeat the above operation. The soldering can all be done without removing the radiator from the frame, and all solder droppings will fall into the tank.

In the drawings I have shown my invention as a complete unit with tank and supports therefor, but it is to be understood that I can and may apply the movable parts of my invention to any make of tank or vat now in use without departing from the spirit of my invention.

Among the advantages of my invention are the following:—One man can test the largest truck radiator without aid or trouble. The radiator is not attached to anything, but lies flat on the frame, and can be moved or set at any angle instantly. One man can, with the use of this device, repair a radiator in six hours, which would ordinarily take ten hours to accomplish. It is not necessary to touch the radiator with the hands in order to submerge the same. The device may be used on cleaning vats where the heat or solution is injurious to the hands.

What is claimed is:—

1. In an apparatus of the character described, a tank, a horizontal frame within said tank, flexible members attached at one end to the frame at separated points for suspending the same, revoluble members over which the flexible members pass, and means connected to all of the flexible members at the other end thereof and operable to pull each of the flexible members vertically the same distance, so as to raise the frame while maintaining its horizontal position.

2. In an apparatus of the character described, a tank, a rectangular frame, chains connected respectively with the corners of the frame by which the frame is suspended, drums over which the chains pass, and means connected to all of said chains and operable to pull each of them vertically the same distance so as to raise the frame while maintaining its horizontal position.

3. In an apparatus of the character described, a tank, a horizontal rectangular frame for supporting a radiator in horizontal position and provided with intermediate cross bars between which the radiator may be supported in vertical position with one corner extending downwardly between the bars, flexible members connected respectively with the corners of the frame and constituting means by which the frame is suspended, revoluble members over which the flexible members pass, and means connected to all of said flexible members and operable to pull all of them vertically simultaneously the same distance, so as to raise the frame while maintaining it in horizontal position.

4. In an apparatus of the character described, a tank, a frame above said tank, chains by which the frame is deachably suspended, a foot lever for lowering said frame, and means for locking said foot lever.

5. In an apparatus of the character described, a tank, a frame above said tank, chains by which the frame is supported, drums supported beneath said tank to which said chains are secured, and means provided for rotating said drums simultaneously.

6. In an apparatus of the character described, a tank, a rectangular frame for supporting a radiator, provided with intermediate cross bars, depending hooked lugs at the corners thereof, and chains engaging said lugs for suspending said frame above said tank.

7. In an automobile radiator testing apparatus, a tank, a rectangular frame for supporting a radiator, a shaft provided with drums suspended beneath said tank, idle pulleys mounted on said tank, chains connected to said drums and passing over said idle pulleys and detachably connected to said frame above said tank, and means for rotating said drums simultaneously.

8. In an apparatus of the character described, the combination of a tank, an open frame having substantially the same shape of the tank but smaller than the same so as to be let down within the tank, chains connected to the corners of the tank, and common operating mechanism connected to the chains for raising and lowering the chains and said frame simultaneously.

In testimony that I claim the foregoing as my own, I have hereto affixed by signature.

JOE FRANK DOZIER.